United States Patent [19]
Roodvoeis

[11] 3,742,581
[45] July 3, 1973

[54] METHOD FOR LAYING A PIPELINE

[75] Inventor: Roger J. Roodvoeis, Grand Rapids, Mich.

[73] Assignee: Laser Alignment, Inc., Grand Rapids, Mich.

[22] Filed: Sept. 20, 1971

[21] Appl. No.: 182,105

Related U.S. Application Data

[63] Continuation of Ser. No. 374, Jan. 2, 1970.

[52] U.S. Cl.............. 29/407, 33/1 H, 33/228, 61/72.1, 61/72.7, 356/153, 356/172
[51] Int. Cl............................................. B23q 17/00
[58] Field of Search ............... 29/407; 33/228, 1 H, 33/286; 61/72.1, 72.7; 356/153, 172

[56] References Cited
UNITED STATES PATENTS

| | | | |
|---|---|---|---|
| 3,631,601 | 1/1972 | McNulty | 356/153 |
| 3,279,070 | 10/1966 | Blount et al. | 33/1 H |
| 3,612,700 | 10/1971 | Nelson | 356/153 |
| 3,599,336 | 8/1971 | Walsh | 33/1 H |
| 3,488,854 | 1/1970 | Trice | 33/286 |
| 3,116,557 | 1/1964 | Trice | 33/228 |

*Primary Examiner*—Charles W. Lanham
*Assistant Examiner*—James R. Duzan
*Attorney*—Price, Heneveld, Huizenga & Cooper

[57] ABSTRACT

This disclosure relates to a method for laying a pipeline along a preselected rectilinear axis by projecting at least two planes of light through the pipe so that each plane is either coplanar or parallel to the selected axis. Markers in a predetermined relationship on the end of each pipe are aligned with the intersection of the planes with the end of each pipe for aligning the pipes along the preselected axis.

19 Claims, 6 Drawing Figures

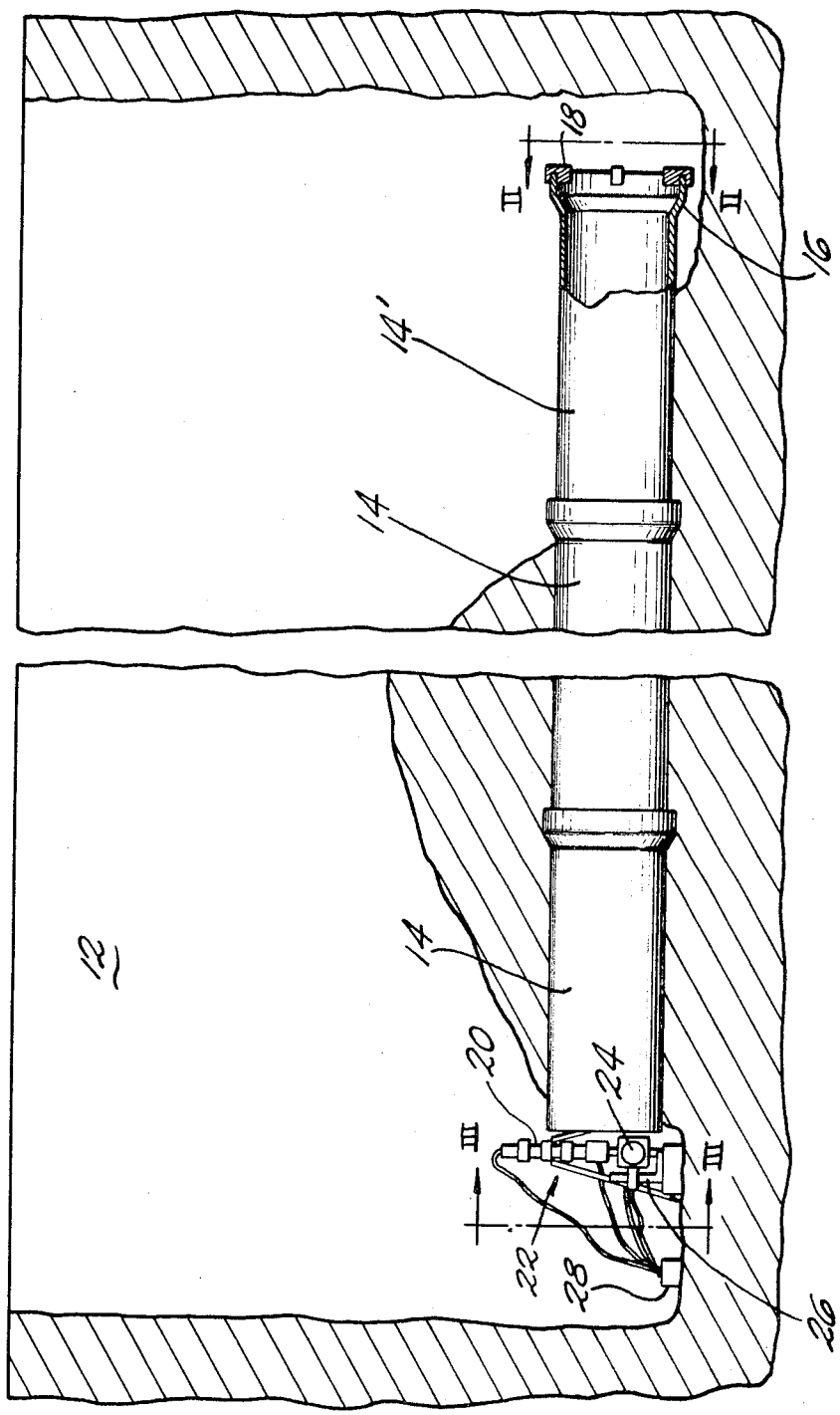

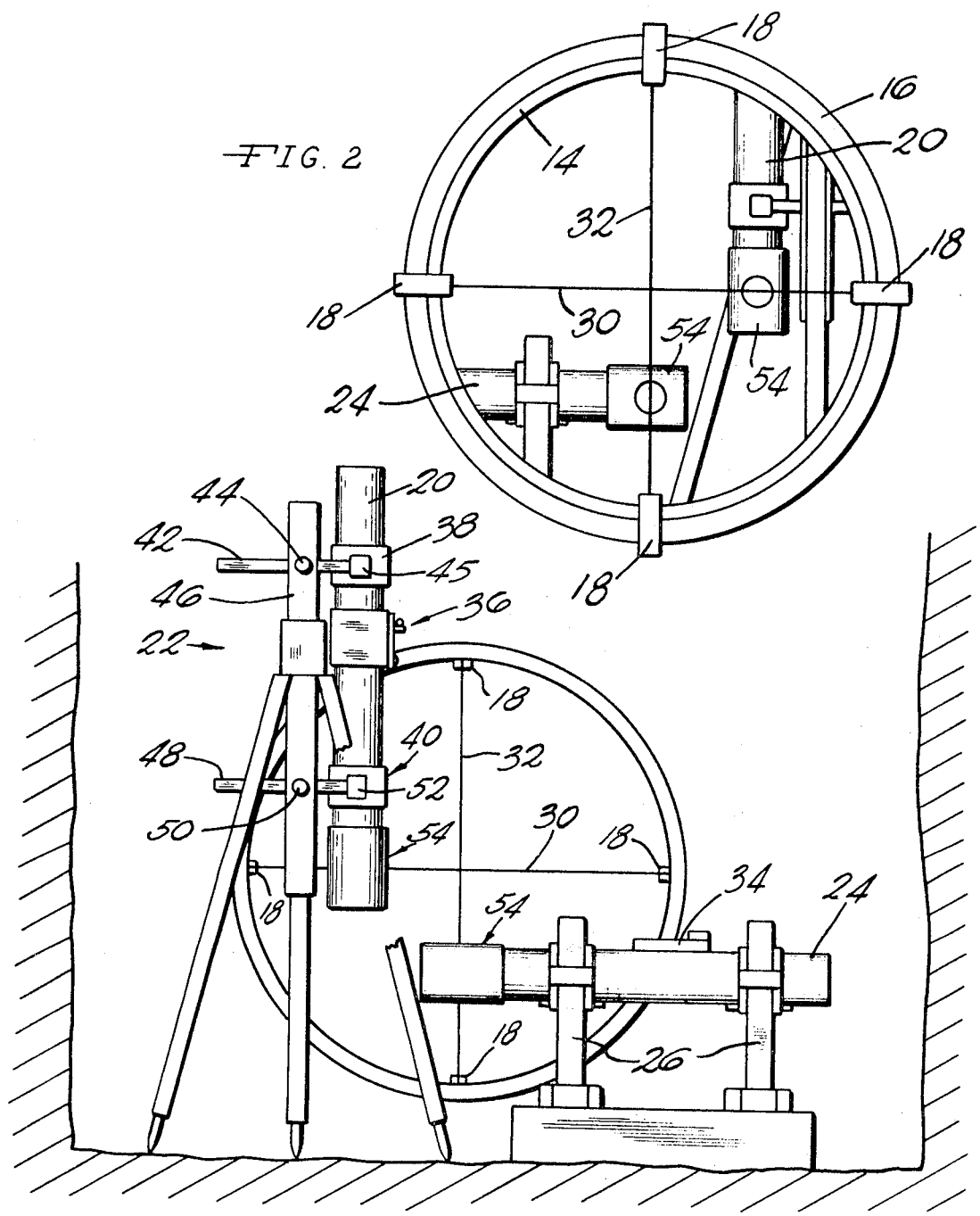

INVENTOR
ROGER J. ROODVOETS

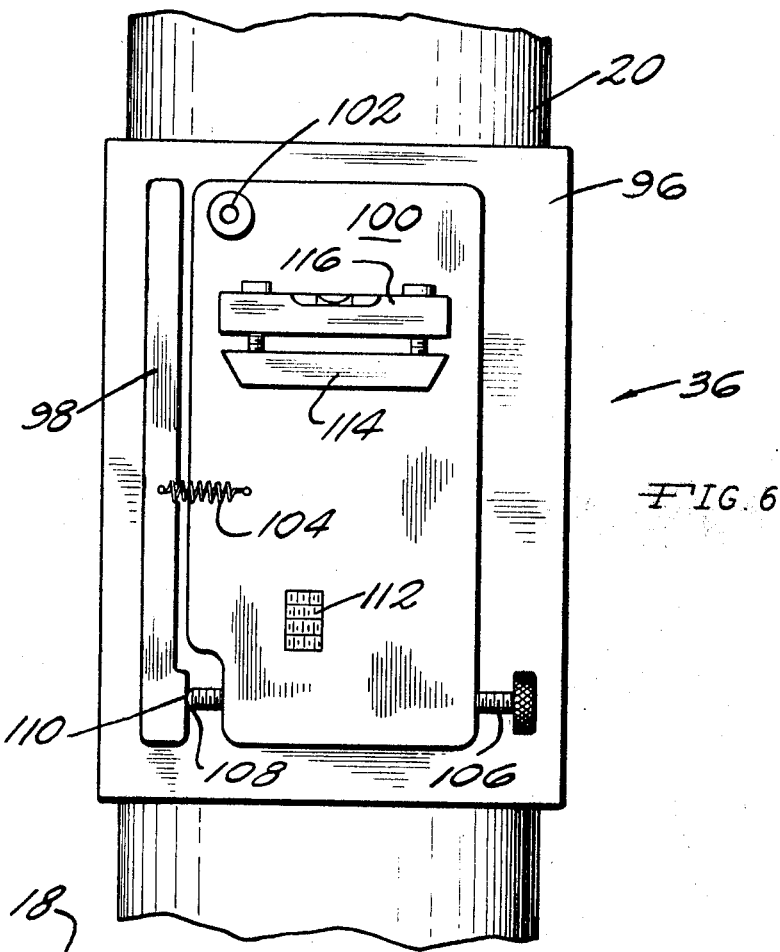
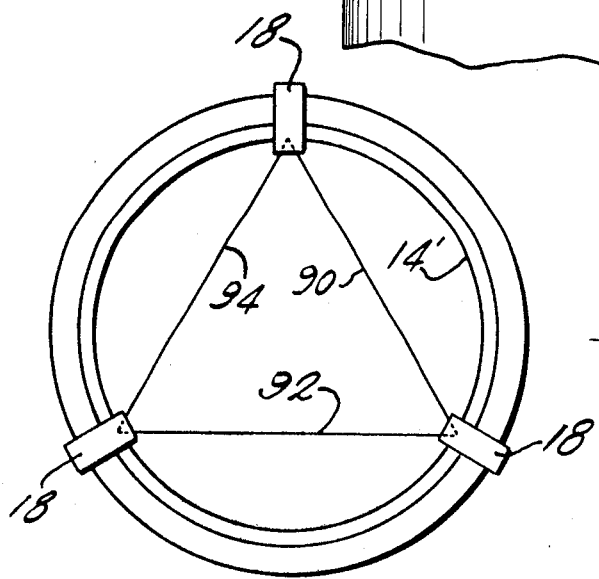
INVENTOR
ROGER J. ROODVOETS

METHOD FOR LAYING A PIPELINE

This is a continuation of application Ser. No. 374, filed Jan. 2, 1970.

This invention relates to the laying of a pipeline. In one of its aspects it relates to the laying of pipeline wherein the pipes are aligned with the use of planes of light projected axially through the pipe and markers on the end of each pipe so aligned.

In U.S. Pat. No. 3,116,557 there is disclosed and claimed a method of laying a pipeline along a preselected rectilinear axis wherein pipes are aligned with a collimated light beam which is projected axially of the pipe. A target on the end of each such pipe is aligned with the collimated light beam. Different sized targets and/or adjustable targets are required for different sized pipes.

I have now discovered that pipes can be aligned with the use of at least two planes of light which are projected axially of the pipeline along or parallel to a preselected axis. With this method, clip-on markers or factory painted markers are used on the end of the pipe thereby eliminating the need for different sized and/or adjustable targets.

By various aspects of this invention one or more of the following, or other, objects can be obtained.

It is an object of this invention to provide an alternate method of accurately aligning pipes along a preselected axis with the use of light which is projected axially of the pipes.

It is a further object of this invention to provide a method of aligning pipes in a pipeline laid along a preselected axis wherein light energy is projected axially through the pipe and pipes are aligned without the use of targets in the end of the pipe.

It is yet another object of this invention to provide a method of aligning pipes in a pipeline laid along a preselected axis in which light energy is projected through the pipe wherein the necessity of different or adjustable targets for the end of the pipe is avoided.

Other aspects, objects, and the several advantages of this invention are apparent to one skilled in the art from a study of this disclosure, the drawings, and the appended claims.

According to the invention there is provided a method for laying a pipeline along a preselected axis wherein each pipe in the pipeline is sequentially aligned with the use of light which is projected through the pipes. According to the improved invention, a first pipe is aligned along the preselected path. At least two planes of light are projected through the first pipe with the planes intersecting the ends of the first pipe at preselected points. Each of the planes is parallel to or coplanar with the preselected axis. A second pipe has markers on the ends thereof corresponding to the preselected points on the first pipe. The other end of the second pipe is inserted in the exit end of the first pipe and the one end of the second pipe containing the markers is moved until the markers on the one end correspond with the intersection of the light planes at the one end of the pipe. The second pipe is then fixed in place. Other pipes are laid sequentially using the same method.

The invention will now be described with reference to the accompanying drawings in which:

FIG. 1 is a side elevational view illustrating the method of the invention;

FIG. 2 is an end view of the pipe illustrated in FIG. 1 and seen along lines II—II of FIG. 1;

FIG. 3 is a view of the other end of the pipe seen along lines III—III of FIG. 1;

FIG. 5 is a view similar to FIG. 2 illustrating an alternate embodiment of the invention; and FIG. 6 is an enlarged side view of a grade setting device which is shown schematically in FIG. 3.

Figure 4:
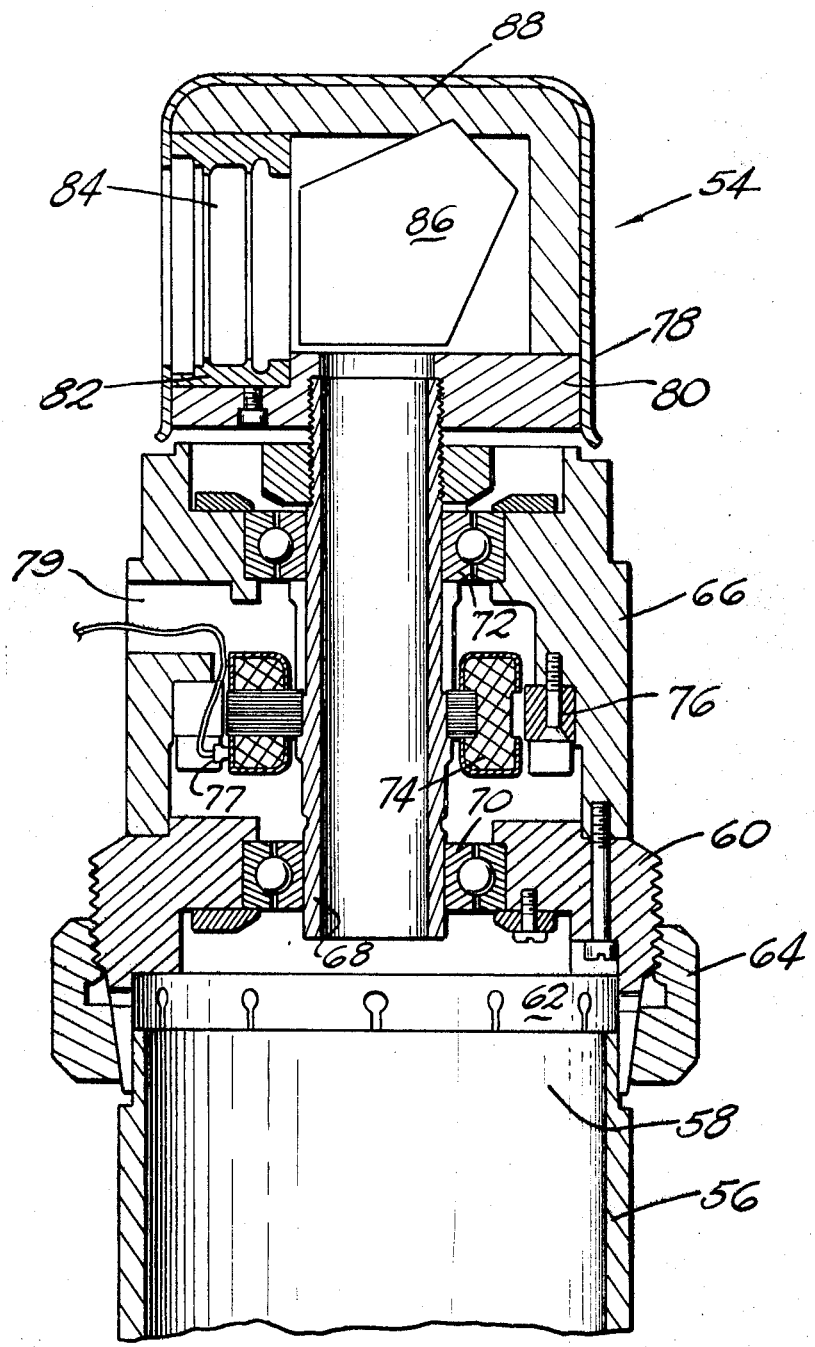
FIG. 4 is a sectional view illustrating a device for producing a plane of light as utilized in accordance with the invention.

Referring now to the drawings, and to FIGS. 1 through 3 in particular, there is shown a trench or excavated cavity 12 in the earth having a plurality of aligned pipes 14 joined end to end. A bell end 16 of the last pipe 14' in the line has markers 18 positioned at diametrically opposite points at the end of said pipe.

The markers illustrated are U-shaped tabs which can be snapped onto the end of the pipe. The markers can be made from a translucent material or a photosensitive material so as to clearly indicate when each marker is in line with a light beam such as from a laser beam generator.

A laser plane generator 20 is supported vertically on a tripod 22 for producing a horizontal laser plane 30. A laser plane generator 24 is horizontally supported on supports 26 for generating a vertical laser plane 32 within the pipe. The laser plane generators are so positioned that the horizontal laser plane 30 and the vertical laser plane 32 intersect at the center of the pipe. Plane 32 is a true vertical and the laser plane 32 is pitched at a grade angle at which the pipe is to be laid. The intersection of the two laser planes 30 and 32 define a grade line along which the pipeline is laid. A level indicating means 34 is positioned on the laser plane generator 24 to properly establish the vertical laser plane 32. Such a device can simply be a spirit level which indicates when generator 24 is level. The laser plane 32 generated by generator 24 is perpendicular to the axis of generator 24.

A leveling and grade setting device 36, is provided on the horizontal laser plane generator 20 to establish the grade of the horizontal laser plane 30. The device 36 indicates when the generator 20 is vertically disposed, thereby making laser plane 30 horizontal. The device also indicates by a dial the pitch of the plane so generated.

Referring to FIG. 6, the grade setting and leveling device 36 comprises an annular collar 96 which fits concentrically over the housing of generator 20. A flange 98 is fixed to collar. A plate 100 is pivotably secured to the collar at pin 102. A spring 104 biases the other end of plate 100 toward flange 98. The angular relationship between plate 100 and flange 98 is determined by a threaded rod 106 which threadably engages plate 100 and has a rounded end 108 which contacts platform 110. The threaded rod is connected through bevel gears (not shown) to a dial 112. A spirit level is mounted on support bar 116 which is fixed to plate 100. The dial is set at zero when the spirit level is horizontal and when the laser plane generated by generator 20 is horizontal. The dial 112 and the pitch of the rod 106 is such that relationship between the vertical and the axis of generator 20 can be read on dial 112 when the spirit level 116 is horizontal.

Referring now again to FIGS. 1 through 3, the laser plane generator 20 is supported by the tripod 22 through brackets 38 and 40. The tripod has a vertical rod 46 and horizontal support rods 42 and 48. A fine adjusting mechanism 45 (such as disclosed in copending Ser. No. 704,024 filed Feb. 8, 1968) connects the horizontal support rod 42 to the bracket 38 and provides an adjustment of the laser tube 20 in two mutually perpendicular horizontal directions.

Likewise, a fine adjusting device 52 connects the support rod 48 to the bracket 40 and provides adjustment of the bottom portion of the laser plane generator 20 in two mutually perpendicular horizontal directions. A thumb screw 44 securely holds the support rod 42 fixed in the vertical rod 46. Likewise, a thumb screw 50 firmly retains the horizontal support rod 48 in the vertical tube 46.

Reference is now made to FIG. 4 to show the device for generating the laser plane. A head 54 is fixed to a sleeve 58 of laser tube 56 through a split collar 62 on an annular based housing 60. The split collar 62 is tightened against the sleeve 58 by an annular wedge 64 which threadably engages the annular base housing 60. A central housing 66 is fixed to the base housing 60.

An annular tube 68 is rotatably supported by the annular base housing 60 through bearings 70 and to the central housing 66 through bearings 72. The tube 68 is rotated relative to the laser tube 56, the base housing 60 and the central housing 66 by a wound rotor, permanent magnet stator, end cap type DC motor. More specifically, a wound rotor 74 is fixed to tube 68, a permanent magnet stator 76 is fixed to the central housing 66. A brush ring 77 is fixed to the permanent magnent 76 and contacts the wound rotor 74. A direct current is supplied to brush ring 77 through wires which enter the central housing through opening 79.

An annular plate 80 is fixed to the top of tube 68 and supports cap 78. A wedge holder 82 is rotatably fixed within the cap 78 between casing 88 and annular plate 80. An optical wedge 84 is fixed within the wedge holder 82. A penta prism 86 is fixed on the annular plate 78 such that the laser beam passing through tube 68 is directed at an angle substantially 90° to the axis of the tube and through the optical wedge 84. Thus, the cap 78 containing the optical wedge 84 and the penta prism 86 rotates relative to the laser tube to generate a plane of light which is perpendicular to the laser beam passing axially along the tube 68.

Whereas the invention has been described with reference to U-shaped markers which are clipped onto the end of the pipe, it is within the scope of the invention to provide markers which are painted on the inside of the bell end of the pipe. Such painting can be done at the factory as a part of the manufacturing process. The paint can be photosensitive or phosphorescent so as to be illuminated when in the laser plane.

Referring now to FIG. 5, the alternate embodiment uses three planes of light, 90, 92, and 94 and three markers 18 on the end of the last pipe 14'. In the illustrated embodiment the three planes are each parallel to the preselected axis and intersect to form a triangle with the apicies of the triangle at the outer circumference of the pipe. When the pipe 14' is properly positioned along the preselected axis, the intersection of the planes 90, 92, and 94 at the bell end of the pipe 14' will correspond with markers 18 as placed in the illustration seen in FIG. 5. As used herein the preselected axis is the center line of the planned pipeline and is parallel to the invert line of the pipe.

OPERATION

In operation, each laser plane generator is established to project a plane of light in the desired direction. This can be done before or after one or more pipes have been laid along a preselected rectilinear axis by conventional methods. One method is to align projector 24 so that the laser plane is in a vertical plane which includes the preselected axis. This can be done by aligning the head 54 with the use of a transit so that the point at which the laser beam emanates from the head falls within a vertical plane which includes the preselected path. For this purpose, the transit can be positioned directly in the vertical plane and behind the laser plane generator 24. Alternately, the transit can be supported above the laser plane generator as on the top of a precast manhole as is common in the art.

After aligning the head of the laser generator in the vertical plane containing the preselected path, a target is then cited through the transit in the ditch at a point spaced from the generator. The laser plane generator 24 is then turned on and its relationship to the target is observed. The end of the laser plane generator 24 opposite head 54 is then adjusted until the plane strikes the target and appears within the plane as seen through the transit. The laser plane generator 24 will then be aligned so that the laser plane 32 lies within a vertical plane containing the preselected path.

The laser plane generator 20 is then aligned so that the plane generated thereby is co-planar with the preselected path. First, the head is adjusted so that the point at which the plane emanates from the head is at the required depth below the surface of the ground for the preselected path at that point. The grade of the preselected path is then set on the generator 20 with the use of the grade setting device 36. The laser generator 20 is adjusted until the grade setting device indicates that the plane 30 is pitched at the angle equal to the preselected path.

With the above described arrangement, each of the planes 30 and 32 will be co-planar with the preselected axis and the intersection of the two planes will coincide with the preselected axis.

Another method of aligning the laser plane in the preselected direction is to first align one or more pipe sections using conventional methods, i.e., Board and Batten method. The head 54 of laser generator 24 is in position so that the beam emanating therefrom is in the horizontal center of the entrance and of the pipe. While maintaining the head 54 in this position, the other end of the laser generator 24 is moved until the plane coincides with markers 18 in the top and bottom of the pipes.

The other laser plane generator 20 is then aligned in a similar manner. Namely, the head 54 of laser plane generator 20 is positioned so that the laser beam emanating therefrom is in the vertical center of the entrance of the pipe. The top of the laser generator 20 is then moved until the plane 30 intersects markers 18 on the opposite sides of the end of the last pipe in the line.

Once the laser plane generators are properly positioned, each pipe is quickly and easily laid with a minimum of time and effort. The new or next pipe to be laid is positioned in the trench with the entrance end in the bell end of the last pipe in the pipeline as illustrated in the drawing (FIG. 1). If the markers are not already on the pipe (as by painting or with prepositioned markers)

the markers are put onto the pipe in prepositioned spots around the circumference of the pipe. For this purpose, a single cross shaped device can be used to first mark the edges of the pipe for positioning the markers, and the markers can then be clipped onto the pipe. At this point, the plane perpendicular to the pipe axis at the entrance end of the pipe will be aligned with the preselected axis, i.e., the axis will pass through the center of the plane, assuming the preselected axis is intended to coincide with the centerline of the pipe.

The pipe is then rotated about its axis and moved until the markers 18 coincide with the planes 30 and 32. The pipe is then fixed in place and the markers 18 removed. The pipe will then be aligned with its axis along the preselected rectilinear axis.

When more than two planes of light are used, they are initially aligned in the same manner as described above, and the aligning of pipes is carried out in the same manner, i.e., by inserting the entrance end of the pipe into the bell end of the previous pipe, and moving the opposite end until the markers coincide with the intersection of the light planes and the bell or exit end of the pipe.

Obviously, many systems can be developed which employ the basic concept of the invention. The planar arrangement of the light will necessarily be coordinated with the markers on the ends of the pipes to ensure precise and accurate alignment of each pipe.

Reasonable variation and modification are possible within the scope of the foregoing disclosure, drawings, and the appended claims without departing from the spirit of the invention.

The embodiments of the invention in which an exclusive property or privilege is claimed are defined as follows:

1. In a method for laying a pipeline along a preselected axis wherein each pipe in the pipeline is sequentially aligned with the use of light which is projected through the pipe, the improvement which comprises:
aligning a first pipe along said preselected path;
projecting at least two planes of light through said first pipe with said planes intersecting the ends of said first pipe at preselected points, each of said planes being parallel to said preselected axis;
providing a second pipe having markers on one end thereof corresponding to said preselected points on said first pipe;
inserting the other end of said second pipe in an end of said first pipe;
moving said one end of said second pipe until said markers on said one end correspond with the intersection of said light planes at said one end of said pipe; and
fixing said second pipe in place.

2. A method according to claim 1 wherein said planes of light intersect at said markers.

3. A method according to claim 1 wherein said markers comprise photosensitive material.

4. In a method for laying a pipeline along a preselected axis wherein each pipe in the pipeline is sequentially aligned with the use of light which is projected through the pipe, the improvement which comprises:
aligning a first pipe along said preselected path;
projecting at least two planes of light through said first pipe with said planes intersecting the ends of said first pipe at preselected points, each of said planes being co-planar with said preselected axis;
providing a second pipe having markers on one end thereof corresponding to said preselected points on said first pipe;
inserting the other end of said second pipe in an end of said first pipe;
moving said one end of said second pipe until said markers on said one end correspond with the intersection of said light planes at said one end of said pipe; and
fixing said second pipe in place.

5. A method according to claim 4 wherein there are two of said planes of light which are perpendicular to each other and intersect at said preselected path.

6. A method according to claim 4 wherein said markers comprise photosensitive material.

7. In a method for laying a plurality of pipes along a preselected axis with the use of a light beam which is projected through the pipes; the improvement comprising: providing a light source means having the characteristic of projecting a light beam along said preselected axis, said projected light having a predetermined configuration; providing pipes each having a plurality of marks positioned at preselected points at one end thereof said marks positioned to correspond with the configuration of said light beam; placing each of said pipes in succession generally along said predetermined axis so that said light beam is projected therethrough; properly aligning said pipes by moving each of said pipes previous to the placement of the next successive pipe until said projected beam intersects said marks at the end of said pipe; and fixing each of said pipes in place after the alignment thereof.

8. The method of claim 7 in which the light beam is formed by projecting at least two planes of light through the pipe with said planes intersecting the ends of said pipe at said marks when said pipes are properly aligned.

9. The method of claim 8 in which each of said planes are parallel to said preselected axis.

10. A method according to claim 9 wherein said planes of light intersect at said marks.

11. A method according to claim 7 wherein said marks comprise photosensitive material.

12. A method according to claim 8 wherein said marks comprise photosensitive material.

13. The method of claim 9 in which each of the planes of light are coplanar with said preselected axis.

14. A method according to claim 13 wherein there are two of said planes of light which are perpendicular to each other and intersect at said preselected path.

15. Apparatus for laying a pipeline along a predetermined axis wherein each pipe in the pipeline is sequentially aligned by means of a light beam projected along the predetermined axis comprising: a source of light for projecting a light beam in a predetermined configuration along said predetermined axis, said configuration being such that said light beam has predetermined portions thereof which simultaneously intersect a plurality of points located on and spaced one from the other on a plane normal to a direction of projection of said light beam; means for mounting said source of light for projecting said light beam along said predetermined axis through a plurality of pipes; and a plurality of marks positioned at predetermined points at one end of each of said pipes, the position of said marks corresponding to the predetermined positions of said portions of said light beam whereby as said pipe is moved into proper alignment with said predetermined axis said portions of said light beam intersect said marks.

16. The apparatus as defined in claim 15 wherein said marks comprise a plurality of radially extending target members positioned about the diameter of said pipe.

17. The apparatus as defined in claim 15 wherein said marks are painted at said predetermined points at the bell end of said pipe.

18. The apparatus as defined in claim 16 wherein said marks are positioned about the inner diameter of said pipes and extend radially inwardly.

19. The apparatus as defined in claim 15 in which the light beam is projected in a plurality of coplanar planes.

* * * * *